US010448226B1

(12) United States Patent
Scott

(10) Patent No.: US 10,448,226 B1
(45) Date of Patent: Oct. 15, 2019

(54) NETWORK SERVICE EXCHANGE SYSTEM AND METHOD OF USING SAME

(71) Applicant: THE BOEING COMPANY, Chicago, IL (US)

(72) Inventor: James P. Scott, Manhattan Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/105,686

(22) Filed: Aug. 20, 2018

(51) Int. Cl.
H04M 3/00 (2006.01)
H04W 4/50 (2018.01)
H04W 12/04 (2009.01)
G06Q 30/08 (2012.01)
H04W 8/18 (2009.01)
H04W 8/28 (2009.01)

(52) U.S. Cl.
CPC .............. *H04W 4/50* (2018.02); *G06Q 30/08* (2013.01); *H04W 8/183* (2013.01); *H04W 12/04* (2013.01); *H04W 8/28* (2013.01)

(58) Field of Classification Search
CPC ..... H04L 41/00; H04L 41/0803; H04L 41/20; H04L 47/70; H04L 67/1097
USPC ......... 455/414.1, 404.1, 515, 410, 566, 445, 455/518, 456.1, 432.1, 406, 422, 411, 455/433, 446
See application file for complete search history.

(56) References Cited

U.S. PATENT DOCUMENTS

| 7,249,085 | B1 | 7/2007 | Kinney, Jr. et al. |
| 8,458,045 | B1* | 6/2013 | Chan ..................... G06Q 20/381 705/14.64 |
| 8,750,158 | B2* | 6/2014 | Morrill ................. H04M 15/00 370/253 |
| 9,094,257 | B2* | 7/2015 | Morrill ............. H04L 29/06027 |
| 2002/0030871 | A1* | 3/2002 | Anderson ............. H04B 1/385 398/132 |
| 2002/0059132 | A1* | 5/2002 | Quay ..................... G06Q 40/04 705/37 |
| 2003/0208563 | A1* | 11/2003 | Acree ..................... H04L 67/16 709/219 |
| 2005/0273790 | A1* | 12/2005 | Kearney, III ........... H04L 12/66 719/328 |
| 2006/0136324 | A1 | 6/2006 | Barry et al. |

(Continued)

OTHER PUBLICATIONS

Radkevitch, Ulad, "Online Reverse Auctions for Procurement of Services," Thesis to obtain the degree of Doctor from the Erasmus University Rotterdam, 2008, 218 pgs.

(Continued)

*Primary Examiner* — Joseph Arevalo
(74) *Attorney, Agent, or Firm* — Toler Law Group, PC

(57) ABSTRACT

A method includes receiving, at a network service exchange system, a request from a device. The request indicates one or more service parameters. The method includes, in response to receiving the request, validating the device and the one or more service parameters. A reverse auction is performed to select a service provider from among a plurality of candidate service providers. The service provider is selected based on the one or more service parameters. The method further includes, after selecting the service provider, performing an over-the-air provisioning process to enable the device to communicate using a network associated with the service provider.

20 Claims, 10 Drawing Sheets

(56) References Cited

U.S. PATENT DOCUMENTS

| | | | | |
|---|---|---|---|---|
| 2007/0016897 | A1* | 1/2007 | Todd | G06F 9/5055 |
| | | | | 717/143 |
| 2008/0228619 | A1* | 9/2008 | Locker | G06Q 30/08 |
| | | | | 705/37 |
| 2014/0229258 | A1* | 8/2014 | Seriani | G06Q 30/08 |
| | | | | 705/14.23 |
| 2015/0332331 | A1* | 11/2015 | Sura | G06Q 30/0264 |
| | | | | 705/14.61 |
| 2016/0127254 | A1* | 5/2016 | Kumar | H04L 47/70 |
| | | | | 709/226 |
| 2016/0337426 | A1* | 11/2016 | Shribman | H04L 65/4084 |
| 2016/0357519 | A1* | 12/2016 | Vargas | G06F 9/451 |
| 2018/0062995 | A1* | 3/2018 | Naar | H04L 45/745 |

OTHER PUBLICATIONS

Yan, M. et al., "A Multi-attribute Reverse Auction Decision Making Model Based on Linear Programming," Systems Engineering Procedia, vol. 4, 2012, pp. 372-378.

Wallsten, Scott, "Reverse Auctions and Universal Telecommunications Service: Lessons from Global Experience," Federal Communications Law Journal, vol. 61, Iss. 2, Art. 4, 2009, pp. 373-394.

Cheng, Chi-Bin, "Solving a sealed-bid reverse auction problem by multiple-criterion decision-making methods," Computers and Mathematics with Applications, vol. 56, 2008, pp. 3261-3274.

\* cited by examiner

NETWORK SERVICE EXCHANGE SYSTEM AND METHOD OF USING SAME

FIELD OF THE DISCLOSURE

The present disclosure is generally related to communication networks and more particularly to selection of service providers of networks using a network service exchange system.

BACKGROUND

Devices use networks to communicate data. As an example, certain sensor devices generate data (e.g., measurements) and use networks to communicate the data to a server or other device. In some cases, a relatively large amount of data is communicated, resulting in network congestion and potentially leading to data loss. For example, certain Internet-of-Things (IoT) devices communicate a large amount of data, particularly in the case of high-resolution sensor devices.

To communicate data, a high-bandwidth network can be selected (e.g., in order to increase data throughput from a sensor to a destination device, such as a server). In some cases, access to a high-bandwidth network is costly. Further, bandwidth availability can change dynamically, such as if a large number of devices enter a network and begin to communicate data using the network.

SUMMARY

In a particular example, a method includes receiving, at a network service exchange system, a request from a device. The request indicates one or more service parameters. The method includes, in response to receiving the request, validating the device and the one or more service parameters. A reverse auction is performed to select a service provider from among a plurality of candidate service providers. The service provider is selected based on the one or more service parameters. The method further includes, after selecting the service provider, performing an over-the-air provisioning process to enable the device to communicate using a network associated with the service provider.

In another example, a method includes sending a request from a device to a network service exchange system. The request indicates one or more service parameters. The method further includes, based on the one or more service parameters, receiving, at the device, a response from the network service exchange system. The response indicates a service bid associated with a service provider. The method further includes receiving, at the device, encrypted information including a service profile associated with the service provider and storing, by the device, the service profile at a subscriber identity module (SIM) card of the device or in a persistent memory of the device. A data connection is established between the device and a network supported by the service provider based on the service profile.

In another example, an apparatus includes a network interface configured to send a request to a network service exchange system. The request indicates one or more service parameters. The network interface is further configured to receive, based on the one or more service parameters, a response from the network service exchange system. The response indicates a service bid associated with a service provider. The apparatus further includes one or more of a universal subscriber identity module (SIM) card or a persistent memory. The apparatus further includes an application processor configured to store encrypted information related to the service provider at the SIM card or the persistent memory.

DETAILED DESCRIPTION

In a particular implementation, a device communicates with a network exchange service system to send a request identifying one or more service parameters. The network exchange service system selects a service provider, from among a plurality of candidate service providers, based on the one or more service parameters, such as using a reverse auction. The network exchange service system communicates to the device a "best" (or "winning") bid associated with a service provider of the plurality of candidate service providers. As a result, in some examples, by communicating with the network exchange service system, the device automatically selects the "best" service based on the one or more service parameters (e.g., without needing to receive and parse details of the services offered by the network exchange service system).

In a particular example, the device stores a plurality of service profiles associated with the plurality of candidate service providers. Each of the plurality of service profiles enables the device to communicate with a respective service provider of the plurality of candidate service providers. As a result, the device is enabled to dynamically switch between services associated with the plurality of candidate service providers.

In a particular implementation, the device includes a subscriber identity module (SIM) card, such as a universal SIM (USIM) card, an embedded SIM (eSIM) card, a software SIM (softSIM) card, or another SIM card. In some examples, the device is configured to store plurality of service profiles at the SIM card in an encrypted format. In some examples, each service provider of the plurality of candidate service providers has access to a key to decrypt a respective service profile of the plurality of service profiles stored at the SIM card. Thus, each service provider is enabled to read and write its own service profile at the SIM card without being granted access to service profiles of other service providers. As a result, in some implementations, a service provider cannot "snoop" information of other service providers in order to manipulate the reverse auction (e.g., the service provider cannot "undercut" other service providers to win the reverse auction), which can simplify operation or decrease cost as compared to restricting service provider access using a multi-SIM implementation or using a partitioned SIM implementation.

Figure 1:
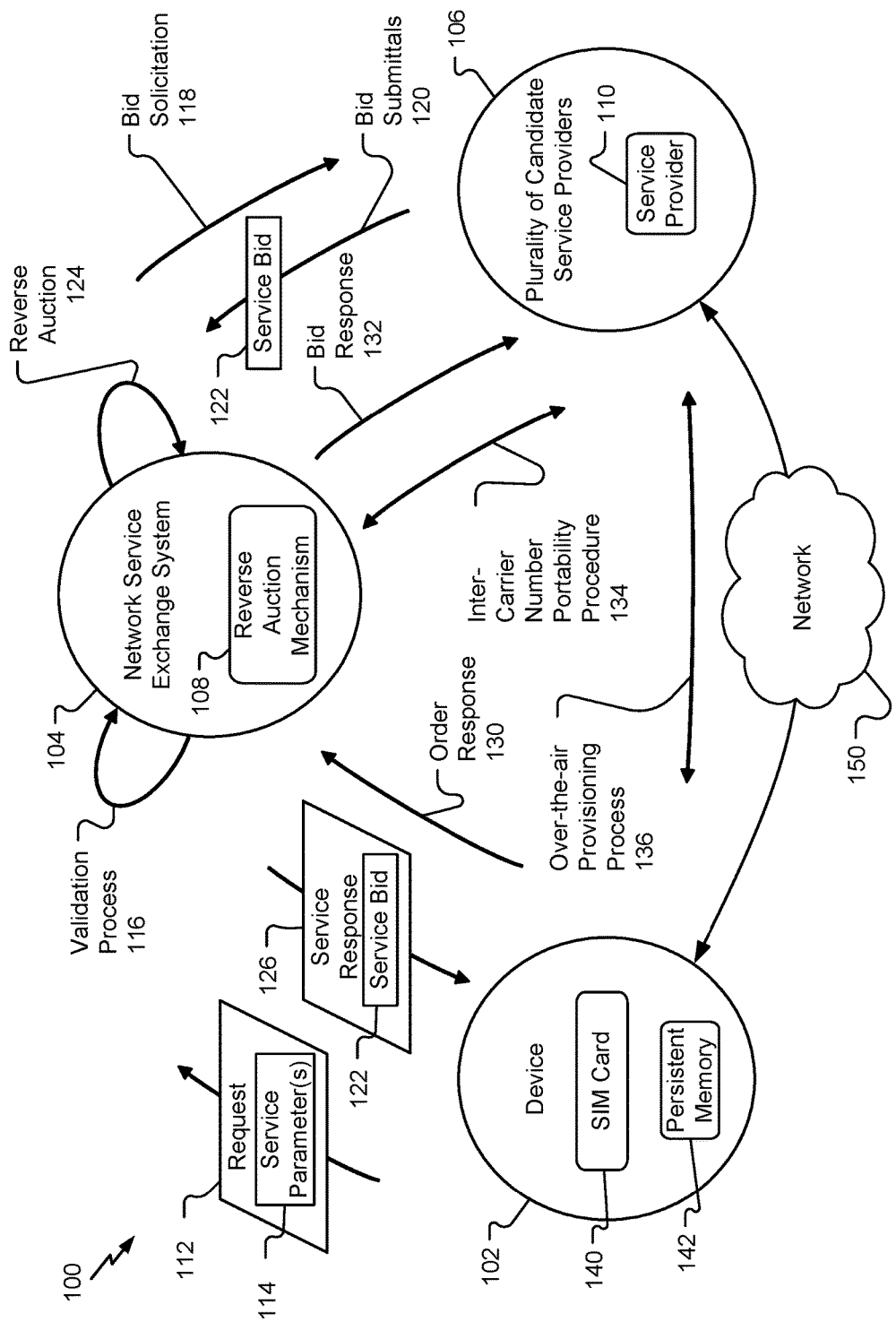
FIG. 1 is a diagram that illustrates aspects of an example of a system that includes a device, a network service exchange system, and a plurality of candidate service providers.

Referring to FIG. 1, a particular illustrative example of a system is depicted and generally designated 100. The system 100 includes a device 102, a network service exchange system 104, and a plurality of candidate service providers 106. The network service exchange system 104 is configured to perform a reverse auction 124 to select a service provider 110 from among the plurality of candidate service providers 106 to provide a service to the device 102.

In a particular example, the device 102 is configured to send and receive data using one or more networks, such as a cellular network, a local area network (LAN), a wireless local area network (WLAN), a wide area network (WAN), an Ethernet network, the Internet, a satellite-based network, one or more other networks, or a combination thereof. In various implementations, the device 102 corresponds to or includes a computer (e.g., a desktop computer, a laptop computer, a tablet computer, a server, or another computer), a mobile device (e.g., a cellular telephone), a sensor device (e.g., an Internet-of-Things (IoT) sensor), or another device, as illustrative examples.

In the example of FIG. 1, the device 102 includes a subscriber identity module (SIM) card 140. In some implementations, the SIM card 140 includes or corresponds to a non-universal SIM card, a universal SIM (USIM) card, an embedded SIM (eSIM) card, a software SIM (softSIM) card, or another SIM card. In some implementations, the device 102 further includes (or hosts) a persistent memory 142 (also referred to herein as a nonvolatile memory).

The plurality of candidate service providers 106 each provide a service, such as access to a network. For example, in some implementations, each of the plurality of candidate service providers 106 offers access to a cellular network, a LAN, a WLAN, a WAN, an Ethernet network, the Internet, one or more other networks, or a combination thereof.

In a particular illustrative example, the network service exchange system 104 includes or corresponds to a computer, such one or more servers, as an illustrative example. FIG. 1 also depicts that the network service exchange system 104 includes reverse auction mechanism 108 configured to perform one or more operations of the reverse auction 124.

During operation, the device 102 is configured to send a request 112 to the network service exchange system 104. The request 112 indicates service parameters 114. In some implementations, the one or more service parameters 114 specify one or more criteria for a network to be used by the device 102.

In some implementations, the device 102 is configured to determine the one or more service parameters 114 using an automatic selection process. For example, in some cases, the device 102 is configured to monitor data communication characteristics associated with data sent or received by the device 102, such as by monitoring one or more of an amount of data sent by the device 102, an amount of data received by the device 102, a number of errors detected in the received data, or a number of errors in the sent data (e.g., based on a number of negative acknowledgement (NACK) messages received by the device 102), as illustrative examples. Alternatively or in addition, in some implementations, the device 102 includes a sensor (e.g., an IoT sensor) that measures data based on one or more sample rates and communicates the data to another device (e.g., a server) via a network. Thus, in some examples, the device 102 is configured to determine the one or more service parameters 114 based on bandwidth usage criteria associated with the device 102. Alternatively or in addition, the one or more service parameters 114 may indicate a type of network capability of the device 102 (e.g., a time division multiple access (TDMA) capability or a code division multiple access (CDMA) capability), a target latency parameter, a number or frequency of messages to be transmitted, a loss ratio, latency, jitter, or one or more other parameters, as illustrative examples.

The network service exchange system 104 is configured to receive the request 112. The network service exchange system 104 is configured to perform a validation process 116 based on the request 112 and the one or more service parameters 114. In a particular example, the network service exchange system 104 is configured to perform a check of available credit card balance (for the case of pre-paid services) or a credit check (for the case of post-paid services) of a party associated with the device 102 to perform the validation process 116. Alternatively or in addition, the validation process 116 may include one or more other operations, such as an authentication or login operation (e.g., using a transport layer security (TLS) or secure sockets layer (SSL) "handshake," as an illustrative example).

The network service exchange system 104 is configured to send a bid solicitation 118 to the plurality of candidate service providers 106. For example, in some implementations, the bid solicitation 118 "advertises" the request 112. In some implementations, the bid solicitation 118 indicates the one or more service parameters 114.

The plurality of candidate service providers 106 are configured to send bid submittals 120 in response to the bid solicitation 118. As a particular example, in some implementations, the service provider 110 is configured to send a service bid 122 of the bid submittals 120 in a response to the bid solicitation 118.

The network service exchange system 104 is configured to perform the reverse auction 124 based on the bid submittals 120. In one example, as described further below, the network service exchange system 104 is configured to determine that the service bid 122 is a "best fit" of the set of bid submittals that comply with one or more service parameters identified in a client service request, such as the one or more service parameters 114 indicated by the request 112.

In response to selecting the service bid 122 from among the bid submittals 120, the network service exchange system 104 is configured to send a service response 126 to the device 102. In the example of FIG. 1, the service response 126 indicates that the service bid 122 is a "best fit" of the bid submittals 120. In some examples, the service response 126 includes the service bid 122 or information associated with the service bid 122.

In some examples, the device 102 is configured to send an order response 130 to the network service exchange system 104. For example, in some implementations, the order response 130 accepts the service bid 122. In other examples, the order response 130 declines the service bid 122, such as if the service bid 122 does not comply with the one or more service parameters 114.

In some examples, the network service exchange system 104 provides a bid response 132 to the service provider 110. In a particular example, the bid response 132 accepts the service bid 122 of the service provider 110. In this example, the network service exchange system 104 provides other responses to other service providers of the plurality of candidate service providers 106 to decline other bid submittals of the bid submittals 120.

In some examples, upon acceptance of the service bid 122 by the device 102, an inter-carrier number portability procedure 134 is performed, such as to "port" a telephone number associated with the device 102 from a current service provider to the service provider 110. In some examples, the inter-carrier number portability procedure 134 is initiated by the network service exchange system 104. In another example, the network service exchange system 104 notifies a current service provider of the device 102 to initiate the inter-carrier number portability procedure 134.

After selection of the service provider 110, an over-the-air provisioning process 136 is performed to enable the device 102 to communicate using a network 150 associated with the service provider 110. For example, as described with reference to FIG. 2, the over-the-air provisioning process 136 can include providing a service profile associated with the service provider 110 to the device 102. In some implementations, the device 102 is configured to store the service profile to the SIM card 140 or in the persistent memory 142 in an encrypted format.

As used herein, a service profile includes information that identifies a service provider, information that enables the device 102 to communicate with a service provider or using a network of a service provider, information related to a service offered by a service provider (e.g., pricing information), other information, or a combination thereof. In some cases, a service profile includes "sensitive" or confidential information, such as pricing information or other sensitive information.

One or more aspects of FIG. 1 illustrate "consolidation" of service provider information (e.g., bids) by a network service exchange system to perform a reverse auction. As a result, selection of a service provider is simplified for a device, such as the device 102.

Figure 2:
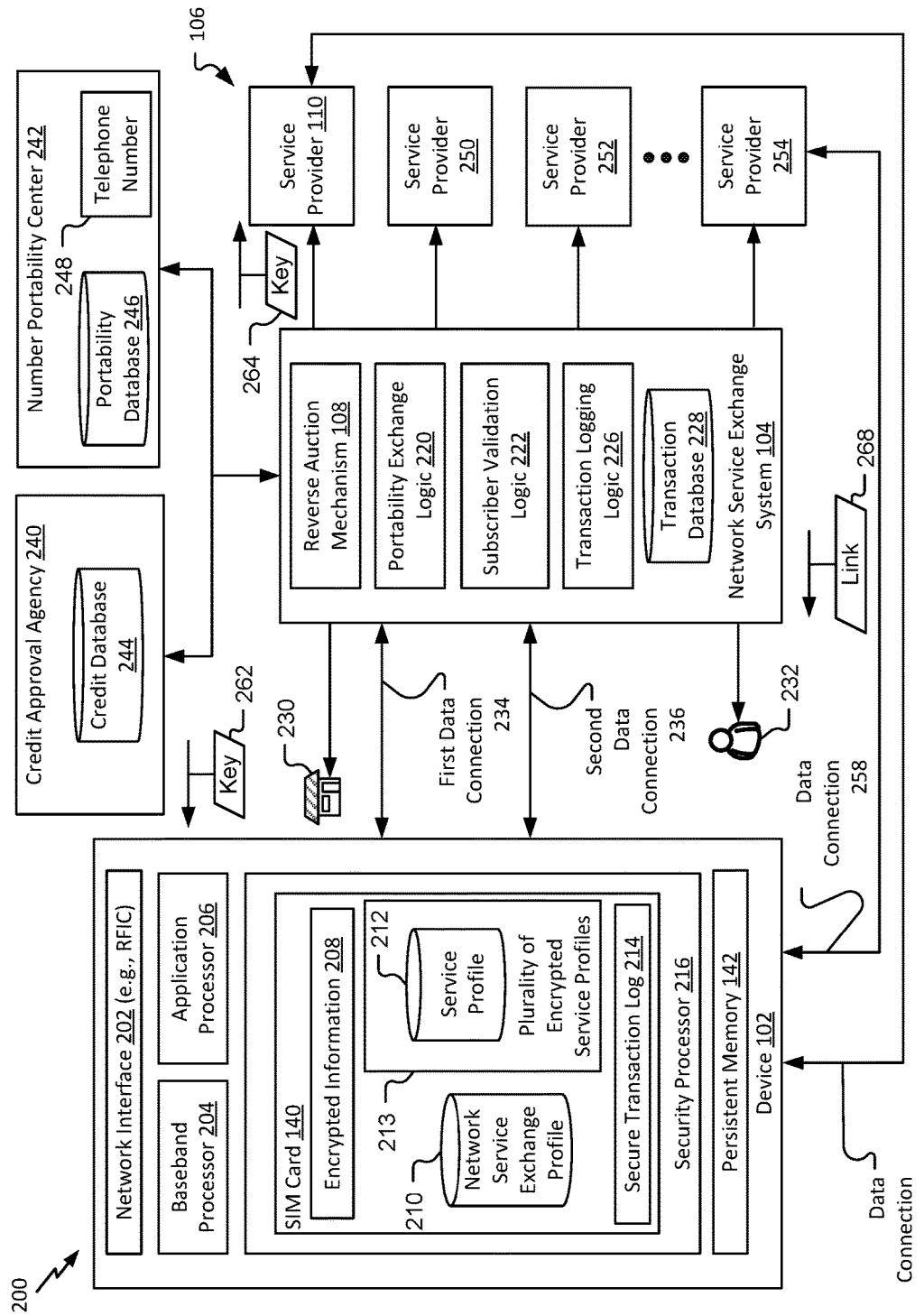
FIG. 2 is a diagram that illustrates aspects of another example of a system that includes a device, a network service exchange system, and a plurality of candidate service providers.

Referring to FIG. 2, a particular illustrative example of a system is depicted and generally designated 200. The system 200 includes the device 102, the network service exchange system 104, and the plurality of candidate service providers 106. FIG. 2 also depicts that the system 200 includes a credit approval agency 240 and a number portability center 242.

In FIG. 2, the device 102 includes a network interface 202, a baseband processor 204, and an application processor 206. In a particular example, the network interface 202 includes a radio frequency integrated circuit (RFIC). In the example of FIG. 2, the device 102 further includes a security processor 216 that includes or that is coupled to the SIM card 140.

In some implementations, the application processor 206 is configured to write encrypted information 208 to the SIM card 140 and to read the encrypted information 208 from the SIM card 140. To illustrate, in some implementations, the encrypted information 208 is related to the service provider 110, and the application processor 206 is configured to store the encrypted information 208 at the SIM card 140. Alternatively or in addition, in some examples, the application processor 206 is configured to store the encrypted information 208 at the persistent memory 142. In some implementations, the encrypted information 208 includes one or more of a network service exchange profile 210 associated with the network service exchange system 104, a service profile 212 associated with the service provider 110, or a secure transaction log 214 associated with network service exchange operations.

To further illustrate, in some implementations, the SIM card 140 is configured to store, in an encrypted format, a plurality of encrypted service profiles 213 including the service profile 212. In one example, the plurality of encrypted service profiles 213 includes service profiles associated with each of the plurality of candidate service providers 106.

FIG. 2 depicts that the network service exchange system 104 includes the reverse auction mechanism 108. In the example of FIG. 2, the network service exchange system 104 further includes portability exchange logic 220, subscriber validation logic 222, and transaction logging logic 226. In some implementations, the network service exchange system 104 stores a transaction database 228.

In some examples, the network service exchange system 104 is configured to communicate with enterprise subscribers 230, commercial subscribers 232, or a combination thereof. In some examples, the device 102 is associated with the enterprise subscribers 230, the commercial subscribers 232, or another group of subscribers.

In FIG. 2, the plurality of candidate service providers 106 includes the service provider 110, a service provider 250, a service provider 252, and a service provider 254. Although four service providers are illustrated in the example of FIG. 2, in other implementations, the system 200 includes a different number of service providers.

During operation, the device 102 uses the network service exchange system 104 to select (e.g., via the reverse auction 124) a service provider, such as the service provider 110. Upon selection of the service provider 110, the device 102 can transfer service from a current service provider (e.g., the service provider 254, as an illustrative example) to the service provider 110. In a particular example, upon transfer of service to the service provider 110, the device 102 communicates using a data connection 256 associated with the service provider 110 instead of using a data connection 258 associated with the current service provider (e.g., the service provider 254). In some examples, the data connection 258 corresponds to or includes a "pre-existing" connection (e.g., the Internet) with which the device 102 communicates prior to establishing connectivity with the service provider 110 and that is used to prepare the device 102 for the over-the-air provisioning process 136 of FIG. 1.

In some examples, to facilitate service provider selection by the network service exchange system 104, a first data connection 234 is established between the device 102 and the network service exchange system 104. In some implementations, the first data connection 234 is established using the network service exchange profile 210.

The network interface 202 is configured to send the request 112 of FIG. 1 to the network service exchange system 104. In some examples, the request 112 of FIG. 1 is received at the network service exchange system 104 from the device 102 via a second data connection 236 that is distinct from the first data connection 234. In some examples, the second data connection 236 is used for communications between the device 102 and the network service exchange system 104 (e.g., to facilitate the reverse auction 124), and the first data connection 234 is used afterward as a "proxy" for the data connection 258 (e.g., so that sensitive information associated with the service provider 110 need not be transferred via the data connection 258 prior to setup of the data connection 256).

The network interface 202 is configured to receive (e.g., via the second data connection 236) the service response 126 of FIG. 1 from the network service exchange system 104. In response to accepting the service bid 122 (e.g., by sending the order response 130 to indicate acceptance of the service bid 122), the over-the-air provisioning process 136 of FIG. 1 is performed.

Upon accepting the service bid 122, the device 102 may receive the service profile 212 to enable communications with the service provider 110. For example, the service profile 212 may include access information that enables devices holding the access information to use the data connection 256. Certain examples herein enable the device 102 to receive the service profile 212 in a secure manner (e.g., so that unauthorized parties do not receive the service profile 212 or do not receive the service profile 212 in an unencrypted format).

In a first example, performing the over-the-air provisioning process 136 includes receiving, via the device 102, the encrypted information 208 from the network service exchange system 104. In a second example, performing the over-the-air provisioning process 136 includes receiving the encrypted information 208 at the device 102 from a second service provider, such as the service provider 254, as an illustrative example. In a third example, performing the over-the-air provisioning process 136 includes receiving a link 268 at the device 102 to enable establishment of a secure tunnel to a server to retrieve the encrypted information.

To further illustrate, in the first example, performing the over-the-air provisioning process 136 includes establishing a particular data connection between the device 102 and the network service exchange system 104 based on the network service exchange profile 210. In a particular example, the particular data connection includes the first data connection 234. In the first example, performing the over-the-air provisioning process 136 also includes receiving the service profile 212 from the network service exchange system 104 via the particular data connection (e.g., via the first data connection 234). Thus, in the first example, the first data connection 234 is used as a "proxy" for the data connection 258 (e.g., so that the service profile 212 need not be transferred via the data connection 258 prior to setup of the data connection 256).

In the second example, the request 112 is sent via a second data connection associated with a second service provider that is distinct from the service provider 110. In one example, the request 112 is sent via the data connection 258 that is associated with the service provider 254. In this case, performing the over-the-air provisioning process 136 includes receiving the encrypted information 208 via the data connection 258. In some examples, encryption may be used to secure communication of the service profile 212 in connection with the second example, as described further below.

In the third example, the request 112 is sent via a second data connection associated with a second service provider that is distinct from the service provider 110, and the link 268 is received via the second data connection. In one example, the second data connection corresponds to the data connection 258. In this example, performing the over-the-air provisioning process 136 includes receiving, from the service provider 254 via the data connection 258, the link 268 to enable establishment of a secure tunnel via the data connection 258 to a server to retrieve the encrypted information 208.

In some implementations, the over-the-air provisioning process 136 of FIG. 1 includes sending a key 264 from the network service exchange system 104 to the service provider 110 to enable the service provider 110 to encrypt the service profile 212 prior to sending the service profile 212 to the device 102. Alternatively or in addition, in some implementations, performing the over-the-air provisioning process 136 includes sending a key 262 from the network service exchange system 104 to the device 102 to enable the device 102 to decrypt the service profile 212 upon receiving the service profile 212. In one example, the device 102 is configured to decrypt the service profile 212 to establish the data connection 256.

In some examples, the network service exchange system 104 is configured to perform the validation process 116 of FIG. 1 by performing a credit check of a party associated with the device 102. In some examples, the network service exchange system 104 performs the credit check or initiates the credit check by sending a message to the credit card company (pre-paid) or credit approval agency (post-paid) 240, and in the latter case the credit approval agency 240 accesses a credit database 244 to determine whether the device 102 is to be validated.

In some implementations, the network service exchange system 104 is configured to initiate or perform operations of the inter-carrier number portability procedure 134 of FIG. 1. In one example, the network service exchange system 104 prompts a current service provider associated with the device 102 to initiate transfer of a telephone number 248 associated with the device 102 to the service provider 110. In another example, the network service exchange system 104 notifies the current service provider associated with the device 102 to perform the inter-carrier number portability procedure 134, such as by contacting the number portability center 242 to access and update a portability database 246.

In some implementations, the network interface 202 is configured to receive the secure transaction log 214 from the network service exchange system 104. In various implementations, the secure transaction log 214 is associated with a per subscriber granularity, a per enterprise granularity, a per auction granularity, or a per service provider granularity. In some implementations, the secure transaction log 214 has a hashed linked list data structure, such as a blockchain data structure.

In some implementations, after receiving the encrypted information 208 (e.g., the service profile 212), communication of data between the device 102 and a second service provider (e.g., the service provider 254) is continued until a trigger condition is satisfied, and the data connection 256 is established responsive to the trigger condition being satisfied. To illustrate, in some implementations, the trigger condition includes one or more of a change in usage of the data connection 258 by the device 102, a change in available bandwidth of the data connection 258, or a promotional offer associated with the service provider 110. Alternatively or in addition, in some examples, the trigger condition is based on bid rankings (or a change in bid rankings) of the plurality of candidate service providers 106, as described further with reference to FIG. 3.

One or more aspects of FIG. 2 illustrate "consolidation" of service provider information (e.g., bids) by a network service exchange system to perform a reverse auction. As a result, selection of a service provider is simplified for a device, such as the device 102.

Figure 3:
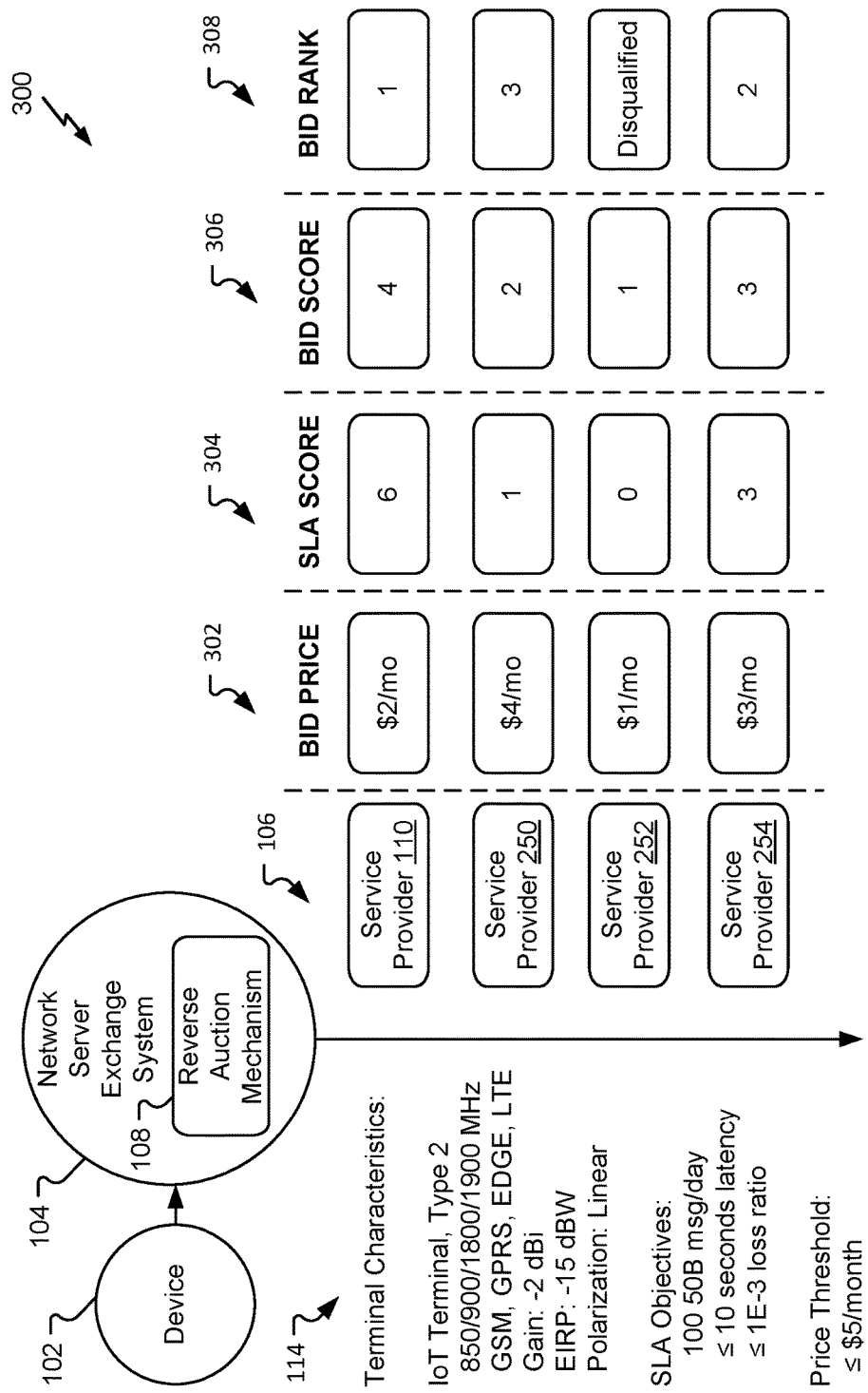
FIG. 3 is a diagram that illustrates aspects of an example of results of a reverse auction performed by a network service exchange system.

FIG. 3 depicts an illustrative example of results 300 of the reverse auction 124 of FIG. 1. In a particular example, the reverse auction mechanism 108 is configured to perform one or more operations of the reverse auction 124 to generate the results 300.

FIG. 3 also illustrates certain non-limiting examples of information that may be included in the one or more service parameters 114. It should be appreciated that the example of FIG. 3 is illustrative and that in other examples the one or more service parameters 114 include other information (alternatively or in addition to the information illustrated in FIG. 3).

The results 300 indicate a bid price 302 for each service provider of the plurality of candidate service providers 106. For example, in some implementations, the bid price 302 of each of the plurality of candidate service providers 106 indicates a price for one or more services specified by the one or more service parameters 114 of the request 112. In one example, each bid price 302 is indicated in a respective bid submittal of the bid submittals 120 of FIG. 1.

The results 300 also indicate a service level agreement (SLA) score 304 for each service provider of the plurality of candidate service providers 106. In a particular example, the reverse auction mechanism 108 is configured to rank each bid of the plurality of candidate service providers 106 with respect to whether (or how much) the bid complies with the one or more service parameters 114 of the request 112. In an illustrative example, the one or more service parameters 114 specify a particular network bandwidth, and the reverse auction mechanism 108 is configured to rank each bid based on whether the bid indicates a service level that offers at least the particular network bandwidth to the device 102. To further illustrate, in the particular example of FIG. 2, the SLA score 304 associated with the service provider 252 corresponds to "0," which can indicate that the bid of the service provider 252 fails to satisfy the one or more service parameters 114.

The results 300 also indicate a bid score 306 for each service provider of the plurality of candidate service providers 106. In a particular example, the reverse auction mechanism 108 is configured to rank each bid of the plurality of candidate service providers 106 with respect to price. For example, the bid score 306 of the service provider 252 indicates that the bid of the service provider 252 (e.g., $1) is better than the other bids ($2, $4, and $3). To illustrate, in one implementation, the reverse auction mechanism 108 is configured to determine each bid score 306 based on:

$$\text{BID\_SCORE} = \omega_{\text{PRICE}}(\text{BID}_i/(\text{BID}_{MAX} - \text{BID}_{MIN})) \times (\text{SLA\_SCORE} \times (1 - \omega_{\text{PRICE}})).$$

In this example, $\omega_{\text{PRICE}}$ indicates a weighting value (e.g., 0.5, or another value), $\text{BID}_i$ indicates a price associated with a particular bid (e.g., where i=1, 2, 3, or 4), $\text{BID}_{MAX}$ indicates the maximum bid of the bids (e.g., $4), $\text{BID}_{MIN}$ indicates the minimum bid of the bids (e.g., $1), and SLA_SCORE indicates the respective SLA score 304 (e.g., 6, 1, 0, or 3).

In a particular illustrative example, the reverse auction mechanism 108 includes a subtraction circuit configured to determine $\text{BID}_{MAX} - \text{BID}_{MIN}$, a division circuit configured to determine $\text{BID}_i/(\text{BID}_{MAX} - \text{BID}_{MIN})$, and a multiplication circuit configured to determine a first value based on $\omega_{\text{PRICE}}(\text{BID}_i/(\text{BID}_{MAX} - \text{BID}_{MIN}))$. In some examples, the reverse auction mechanism 108 is configured to determine (using the subtraction circuit or another subtraction circuit) $1 - \omega_{\text{PRICE}}$. In some implementations, the reverse auction mechanism 108 is further configured to determine (using the multiplication circuit or one or more other multiplication circuits) a second value based on $\text{SLA\_SCORE} \times (1 - \omega_{\text{PRICE}})$ and to multiply the first value and the second value to determine each bid score 306.

The results 300 also indicate bid rank 308 for each service provider of the plurality of candidate service providers 106. In a particular example, the reverse auction mechanism 108 is configured to generate each bid rank 308 based on the corresponding SLA score 304 and the corresponding bid score 306. For example, in some implementations, the reverse auction mechanism 108 is configured to disqualify any bid having an SLA score 304 of "0" and to rank remaining bids by bid scores 306 to determine the bid ranks 308.

In some implementations, the network service exchange system 104 is configured to monitor changes in the results 300, such as in response to a pricing change indicated by one or more of the plurality of candidate service providers 106. In this case, the network service exchange system 104 is configured to notify the device 102 of changes in the results 300, such as by sending an updated service response indicating an updated service bid to the device 102. In a particular illustrative example, in response to the service provider 110 increasing pricing so that the bid of the service provider 254 is better than the bid of the service provider 110, the network service exchange system 104 notifies the device 102 by sending an updated service response that indicates the service provider 254. In this example, the device 102 submits to the network service exchange system 104 an updated order response to transfer service from the service provider 110 to the service provider 254 (e.g., using any of the aspects described with reference to FIG. 2). In various implementations, updated service responses are triggered by the device 102 (e.g., in a "pull" implementation), by the network service exchange system 104 (e.g., in a "push" implementation), or both.

Although certain examples of FIG. 3 are described with reference to price for convenience of description, in other implementations, other parameters are "scored" and used to determine each bid rank 308. As an illustrative example, in some implementations, one or more of an upload speed or a download speed of networks associated with the service providers 110, 250, 252, and 254 are "scored" and used to determine each bid rank 308.

One or more aspects of FIG. 3 illustrate "consolidation" of service provider information (e.g., bids) by a network service exchange system to perform a reverse auction. As a result, selection of a service provider is simplified for a device, such as the device 102.

Figure 4:
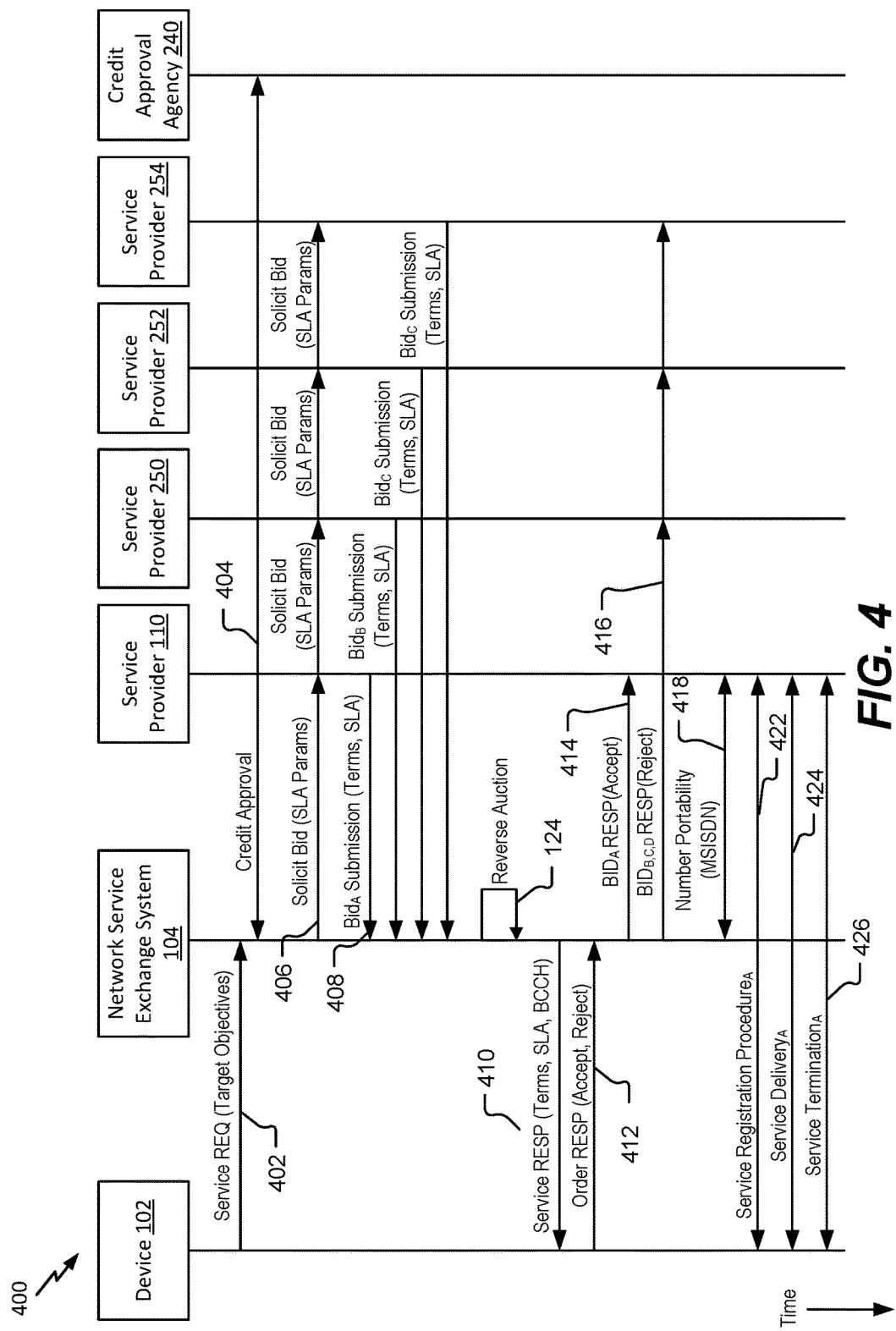
FIG. 4 is a ladder diagram illustrating operations performed at a system that includes a device, a network service exchange system, and a plurality of candidate service providers.

Referring to FIG. 4, particular illustrative operations that can be performed by the system 200 of FIG. 2 are depicted and generally designated 400. The operations 400 include receiving a request, at 402. The request indicates target objectives. In one example, the request corresponds to the request 112 of FIG. 1, and the target objectives correspond to the one or more service parameters 114.

The operations 400 further include performing a credit approval process, at 404. In one example, the credit approval process corresponds to the validation process 116 of FIG. 1. In some examples, the reverse auction 124 is performed on a pre-paid basis by the network service exchange system 104. In this case, in some implementations, the validation process 116 includes checking availability of funds or credit (e.g., by checking a credit card balance) of a party associated with the device 102. In another example, the reverse auction 124 is performed on a post-paid basis by the network service exchange system 104. In this case, in some implementations, the validation process 116 includes performing a credit check of a party associated with the device 102.

The operations 400 further include soliciting bids from the plurality of candidate service providers 106, at 406. The operations 400 further include receiving bid submissions, such as a representative bid submission 408. Each of the bid submissions indicates service information, such as service terms and a service level agreement (SLA) that indicates network characteristics, such as network quality and availability, as illustrative examples. In one example, the bid submissions of FIG. 4 correspond to the bid submittals 120 of FIG. 1.

The operations 400 further include performing the reverse auction 124. In a particular example, performing the reverse auction 124 includes one or more aspects described with reference to FIG. 3.

The operations 400 further include receiving a service response, at 410. The service response indicates the service terms and the SLA. In some implementations, the service response indicates control information associated with a network of the "winner" of the reverse auction 124, such as a broadcast control channel (BCCH) associated with the network 150, as an illustrative example. In a particular example, the service response of FIG. 4 corresponds to the service response 126 of FIG. 1.

The operations 400 further include sending an order response, at 412. The order response 412 either accepts or rejects the service response 410. In a particular example, the order response of FIG. 4 corresponds to the order response 130 of FIG. 1.

The operations 400 further include sending a bid response, at 414, and sending one or more bid responses, at 416. In one example, the bid of the service provider 110 are accepted, at 414, and other bids of the plurality of candidate service providers 106 are declined via the other bid responses, at 416.

The operations 400 further include performing a number portability operation, at 418. In a particular example, the number portability operation is performed based on a mobile station international subscriber directory number (MSISDN). In some examples, the number portability operation corresponds to the inter-carrier number portability procedure 134 of FIG. 1.

The operations 400 further include performing a service registration procedure, at 422. The service registration procedure is performed between the device 102 and the service provider 110. In a particular example, the service registration procedure 422 of FIG. 4 includes decrypting the service profile 212 by the device 102 and communicating using the data connection 256, such as described with reference to FIG. 2.

The operations 400 further include performing service delivery, at 424. In a particular example, the device 102 communicates data using a network, such as the network 150 of FIG. 1, using the data connection 256 of FIG. 2, or a combination thereof.

The operations 400 further include service termination, at 426. For example, in some implementations, the device 102 initiates a second reverse auction by the network service exchange system 104, such as to upgrade communication capabilities of the device 102.

One or more aspects of FIG. 4 illustrate "consolidation" of service provider information (e.g., bids) by a network service exchange system to perform a reverse auction. As a result, selection of a service provider is simplified for a device, such as the device 102.

Figure 5:
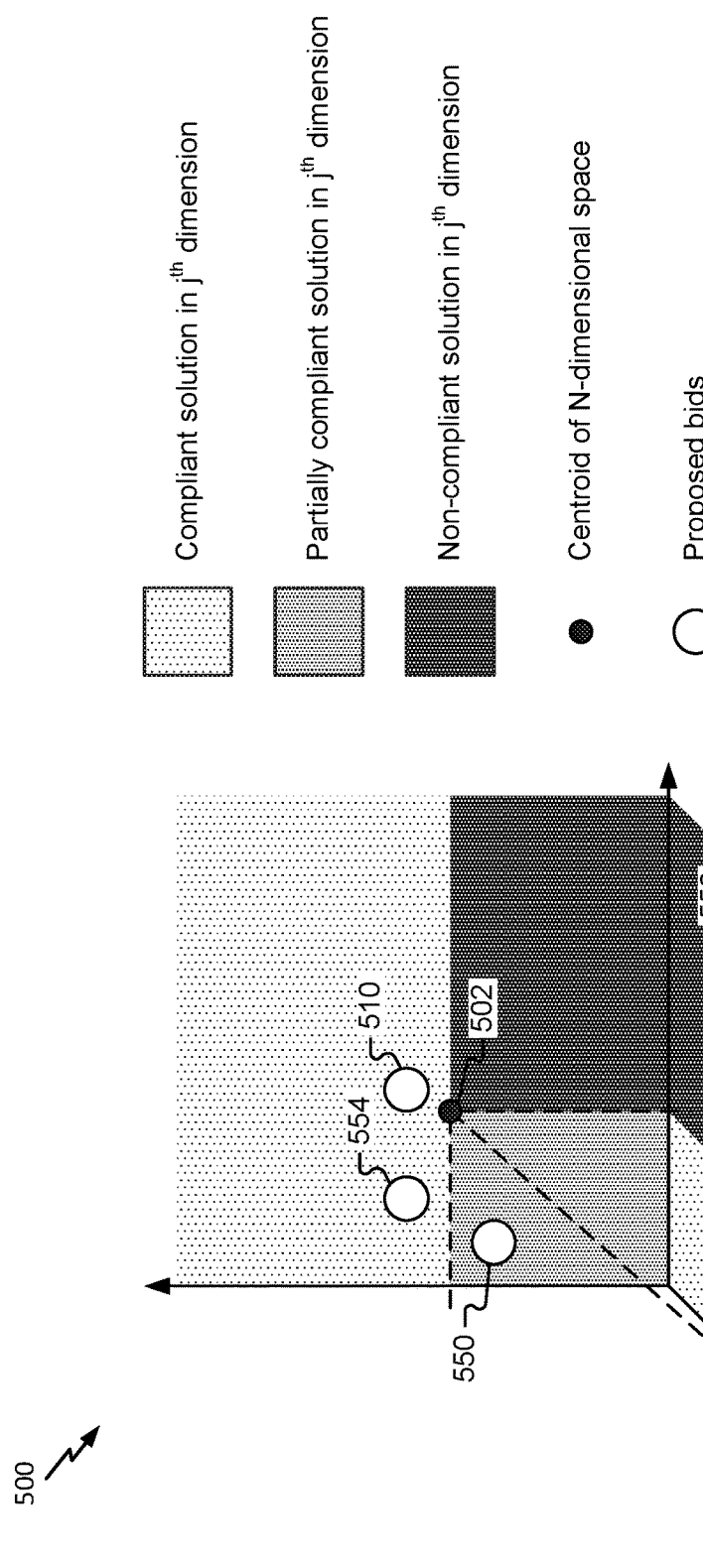
FIG. 5 is a diagram illustrating an example of a graph that indicates a centroid associated with bids from a plurality of candidate service providers.

Referring to FIG. 5, a particular illustrative example of a graph is depicted and generally designated 500. In some implementations, the network service exchange system 104 is configured to determine information corresponding to the graph 500 during the reverse auction 124.

The graph 500 indicates proposed bids corresponding to the bid submittals 120 of FIG. 1. For example, the graph 500 indicates bids 510, 550 552, and 554. In a particular example, the bids 510, 550 552, and 554 respectively correspond to bids of the service providers 110, 250, 252, and 254.

In some implementations, the reverse auction mechanism 108 of the network service exchange system 104 is configured to determine a centroid 502 based on the bids 510, 550 552, and 554. In some implementations, the centroid 502 corresponds to a "center" of the bids 510, 550 552, and 554 in an N-dimensional space (where N is an integer greater than or equal to 1). In some examples, N corresponds to a number of parameters of the one or more service parameters 114.

In some examples, for each jth dimension of the N dimensional space (where $0<j\leq N$), the reverse auction mechanism 108 is configured to determine whether a solution is compliant, partially compliant, or non-compliant. To illustrate, in the example of FIG. 5, the bids 510, 554 are compliant, the bid 550 is partially compliant, and the bid 552 is non-compliant. To illustrate, in some examples, if the bid 552 of the service provider 252 fails to satisfy the one or more service parameters 114 as described with reference to FIG. 3, the bid 552 is non-compliant, as depicted in FIG. 5.

One or more aspects of FIG. 5 illustrate "consolidation" of service provider information (e.g., bids) by a network service exchange system to perform a reverse auction. As a result, selection of a service provider is simplified for a device, such as the device 102.

Figure 6:
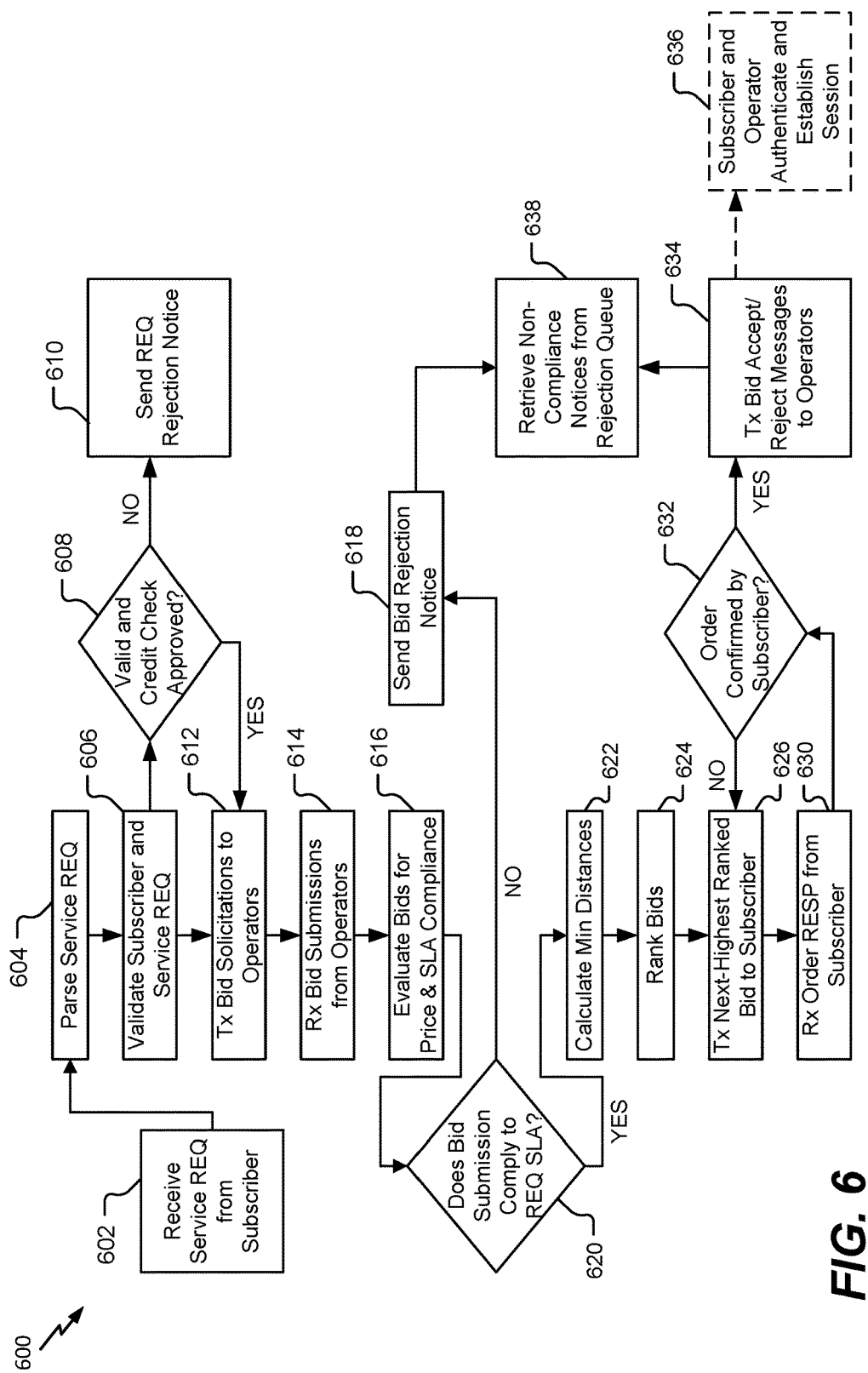
FIG. 6 is a flow chart of an example of operations performed by a network service exchange system.

Referring to FIG. 6, a particular illustrative example of a method is depicted and generally designated 600. In a particular example, the method 600 is performed by the network service exchange system 104.

The method 600 includes receiving a request from a subscriber, at 602. In a particular example, the network service exchange system 104 is configured to receive the request 112 from the device 102.

The method 600 further includes parsing the request, at 604. In a particular example, the network service exchange system 104 parses the request 112 to detect the one or more service parameters 114.

The method 600 further includes validating the subscriber and the request, at 606. In a particular example, validating the subscriber and the request includes performing the validation process 116 of FIG. 1.

The method 600 further includes transmitting bid solicitations to operators, at 612. In a particular example, the network service exchange system 104 sends the bid solicitation 118 to the plurality of candidate service providers 106.

The method 600 further includes receiving bid submissions from the operators, at 614. In a particular example, the network service exchange system 104 receives the bid submittals 120 from the plurality of candidate service providers 106.

The method 600 further includes evaluating the bid submissions for price and service level agreement compliance, at 616. For example, in some implementations, the one or more service parameters 114 indicate a price and a service level agreement type, and the network service exchange system 104 evaluates the bid submittals 120 to determine whether each of the bid submittals 120 complies with the one or more service parameters 114.

The method 600 further includes determining, for each bid submission, if the bid submission complies with the service level agreement indicated in the request, at 620. In a particular example, if a bid submission does not comply with the service level agreement indicated by the request, the network service exchange system 104 sends a bid rejection notice, at 618. Alternatively, for each of the bid submissions, if the bid submission complies with the service level agreement indicated by the request, then the network service exchange system 104 can calculate minimum distances, at 622.

The method 600 further includes ranking the bids, at 624, and transmitting a next highest ranked bid to the subscriber, at 626. At 630, an order response is received from the subscriber. If the order response received from the subscriber does not confirm the order, then the method 600 continues, at 626. If the order response from the subscriber confirms the order, then a bid accept or reject message is transmitted to each operator, at 634. The method 600 further includes retrieving non-compliance notices from a rejection queue, at 638. In some implementations, upon acceptance of a bid submittal, the subscriber and the operator authenticate and establish a session, at 636.

One or more aspects of FIG. 6 illustrate "consolidation" of service provider information (e.g., bids) by a network service exchange system to perform a reverse auction. As a result, selection of a service provider is simplified for a device, such as the device 102.

Figure 7:
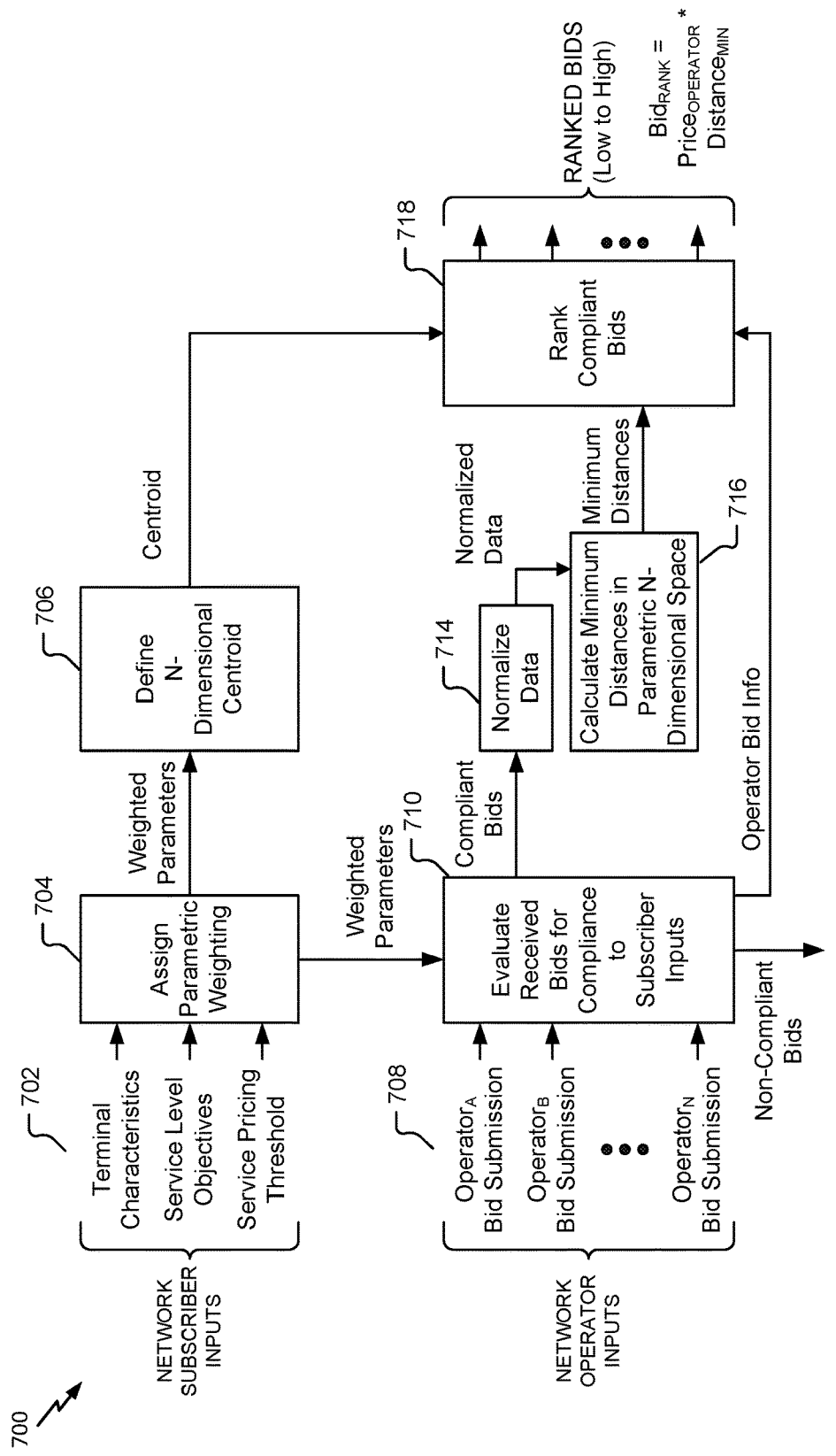
FIG. 7 is a flow chart of another example of operations performed by a network service exchange system.

Referring to FIG. 7, a particular illustrative example of a method is depicted and generally designated 700. In a particular example, operations of the method 700 are performed by the network service exchange system 104.

The method 700 includes receiving network subscriber inputs, at 702. In a particular example, the network subscriber inputs are indicated by the request 112 of FIG. 1, such as within the one or more service parameters 114. In the example of FIG. 7, the network subscriber inputs include one or more terminal characteristics associated with the device 102, one or more service level objectives associated with a service to be provided to the device 102, or service pricing threshold information.

The method 700 further includes assigning parametric weighting to the network subscriber inputs, at 704. Assigning the parametric weighting to the network subscriber inputs generates weighted parameters. In a particular example, each network subscriber input is associated with a particular weight value that corresponds to an importance of the network subscriber input.

The method 700 further includes defining and an N-dimensional centroid, at 706. In a particular example, the centroid corresponds to the centroid 502 described with reference to FIG. 5.

The method 700 further includes receiving network operator inputs, at 708. In a particular example, the network service exchange system 104 receives the bid submittals 120 from the plurality of candidate service providers 106.

The method 700 further includes evaluating, based on the weighted parameters, the received bids for compliance to subscriber inputs, at 710. In a particular example, the network service exchange system 104 evaluates each of the bid submittals 120 for compliance with the one or more service parameters 114 to determine compliant bids and non-compliant bids of the bid submittals 120. In some examples, the one or more service parameters 114 indicate one or more threshold (or "minimum") values for one or more criteria, such as a minimum upload speed, as an illustrative example. Thus, in some cases, a bid submittal is non-compliant for failing to satisfy a threshold value of a criterion. Alternatively or in addition, in some implementations, a weighting scheme is used in which each bid submittal is "scored" for each criterion to generate a "global" score. In this example, a bid submittal can be non-compliant if the global score associated with the bid fails to satisfy a threshold score.

The method 700 further includes normalizing data based on the compliant bids, at 714, to generate normalized data. The method 700 further includes calculating minimum distances in a parametric N-dimensional space, at 716 to generate minimum distances. The method 700 further includes ranking the compliant bids, at 718, to generate ranked bids.

One or more aspects of FIG. 7 illustrate "consolidation" of service provider information (e.g., bids) by a network service exchange system to perform a reverse auction. As a result, selection of a service provider is simplified for a device, such as the device 102.

Figure 8:
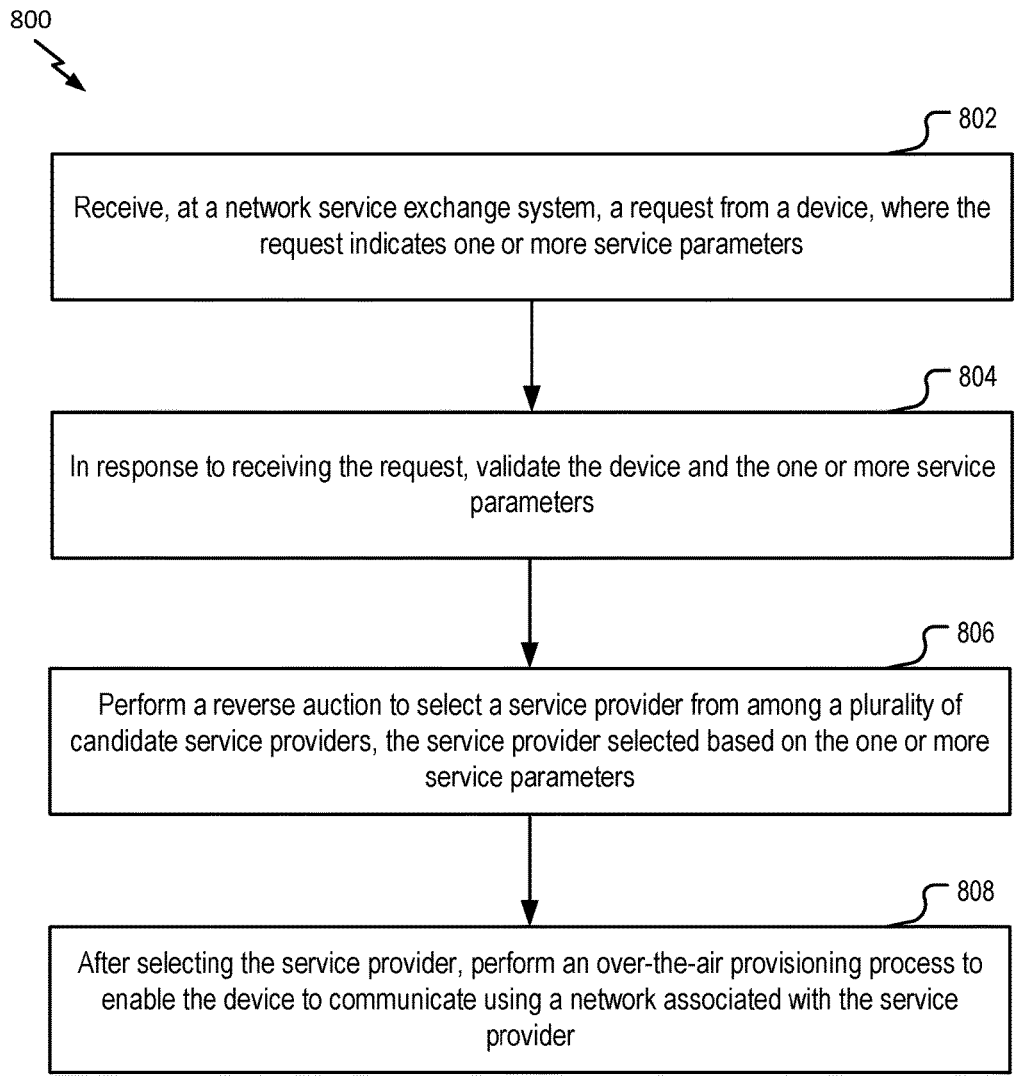
FIG. 8 is a flow chart of another example of a method of operation of a network service exchange system.

Referring to FIG. 8, a particular illustrative example of a method is depicted and generally designated 800. In a particular example, operations of the method 800 are performed by a network service exchange system, such as the network service exchange system 104.

The method 800 includes receiving, at the network service exchange system, a request from a device, at 802. The request indicates one or more service parameters. In one example, the network service exchange system 104 receives from the device 102 the request 112 indicating the one or more service parameters. In some implementations, the request 112 is received at the network service exchange system 104 from the device 102 via the second data connection 236. In some examples, validating the one or more service parameters includes determining that the one or more service parameters are within a particular range of values (e.g., where a price parameter is to be a positive number, and where other values of the price parameter cause the network service exchange system 104 to generate an error message).

The method 800 further includes validating the device and the one or more service parameters in response to receiving the request, at 804. In some examples, validating the device includes performing a credit check of a party associated with the device, such as by performing (or initiating) the validation process 116, by contacting the credit approval agency 240, by accessing the credit database 244, or a combination thereof.

The method 800 further includes performing a reverse auction to select a service provider from among a plurality of candidate service providers, at 806. The service provider is selected based on the one or more service parameters. In one example, the network service exchange system 104 performs the reverse auction 124 to select the service provider 110 based on the one or more service parameters 114.

The method 800 further includes performing an over-the-air provisioning process after selecting the service provider to enable the device to communicate using a network associated with the service provider. In some implementations, the network service exchange system 104 performs the over-the-air provisioning process 136 to enable the device 102 to communicate with the service provider 110 using the network 150.

In one example, prior to performing the over-the-air provisioning process, the method 800 further includes establishing a first data connection between the device and the network service exchange system using a network service exchange profile that is associated with the network service exchange system. To illustrate, in some examples, the network service exchange system 104 establishes the first data connection 234 with the device 102 using the network service exchange profile 210 prior to performing the over-the-air provisioning process 136. In some examples, the method 800 further includes receiving, at the network service exchange system from the service provider, a service profile that is associated with the service provider, and performing the over-the-air provisioning process includes sending the service profile to the device from the network service exchange system via the first data connection.

In one example, the network service exchange system 104 receives the service profile 212 from the service provider 110, and performing the over-the-air provisioning process 136 in connection with the method 800 includes sending the service profile 212 to the device 102 from the network service exchange system 104 via the first data connection 234. In some implementations, performing the over-the-air provisioning process 136 in connection with the method 800 includes sending a key (e.g., the key 264) from the network service exchange system 104 to the service provider 110 to enable the service provider 110 to encrypt a service profile (e.g., the service profile 212) that is to be accessed by the device 102. Alternatively or in addition, in some implementations, performing the over-the-air provisioning process 136 in connection with the method 800 the over-the-air provisioning process 136 includes sending a key (e.g., the key 262) from the network service exchange system 104 to the device 102 to enable the device 102 to decrypt a service profile (e.g., the service profile 212) that is to be received by the device 102 from the service provider 110.

In some implementations, performing the reverse auction 124 in connection with the method 800 includes receiving a plurality of bids from the plurality of candidate service providers, such as the bid submittals 120 from the plurality of candidate service providers 106. In some implementations, the performing the reverse auction 124 in connection with the method 800 includes determining, based on the plurality of bids, a plurality of bid scores (e.g., the bid scores 306). In some implementations, performing the reverse auction 124 in connection with the method 800 includes determining a subset of the plurality of bid scores, where the subset is associated with networks that satisfy the one or more service parameters. For example, the bid of the service provider 252 can be "disqualified," as described with reference to FIG. 3, and the bids of the service providers 110, 250, and 254 can correspond to the subset. In some implementations, performing the reverse auction 124 in connection with the method 800 includes selecting the service provider 110 based on a best bid of the subset (e.g., by determining that the bid rank of the service provider 110 is better than the bid rank of the service providers 250, 254).

In some implementations, the method 800 further includes notifying, by the network service exchange system, a current service provider (e.g., the service provider 254) to perform the inter-carrier number portability procedure 134 to prompt transfer of a telephone number (e.g., the telephone number 248) associated with the device 102 to the service provider 110.

One or more aspects of FIG. 8 illustrate "consolidation" of service provider information (e.g., bids) by a network service exchange system to perform a reverse auction. As a result, selection of a service provider is simplified for a device, such as the device 102.

Figure 9:
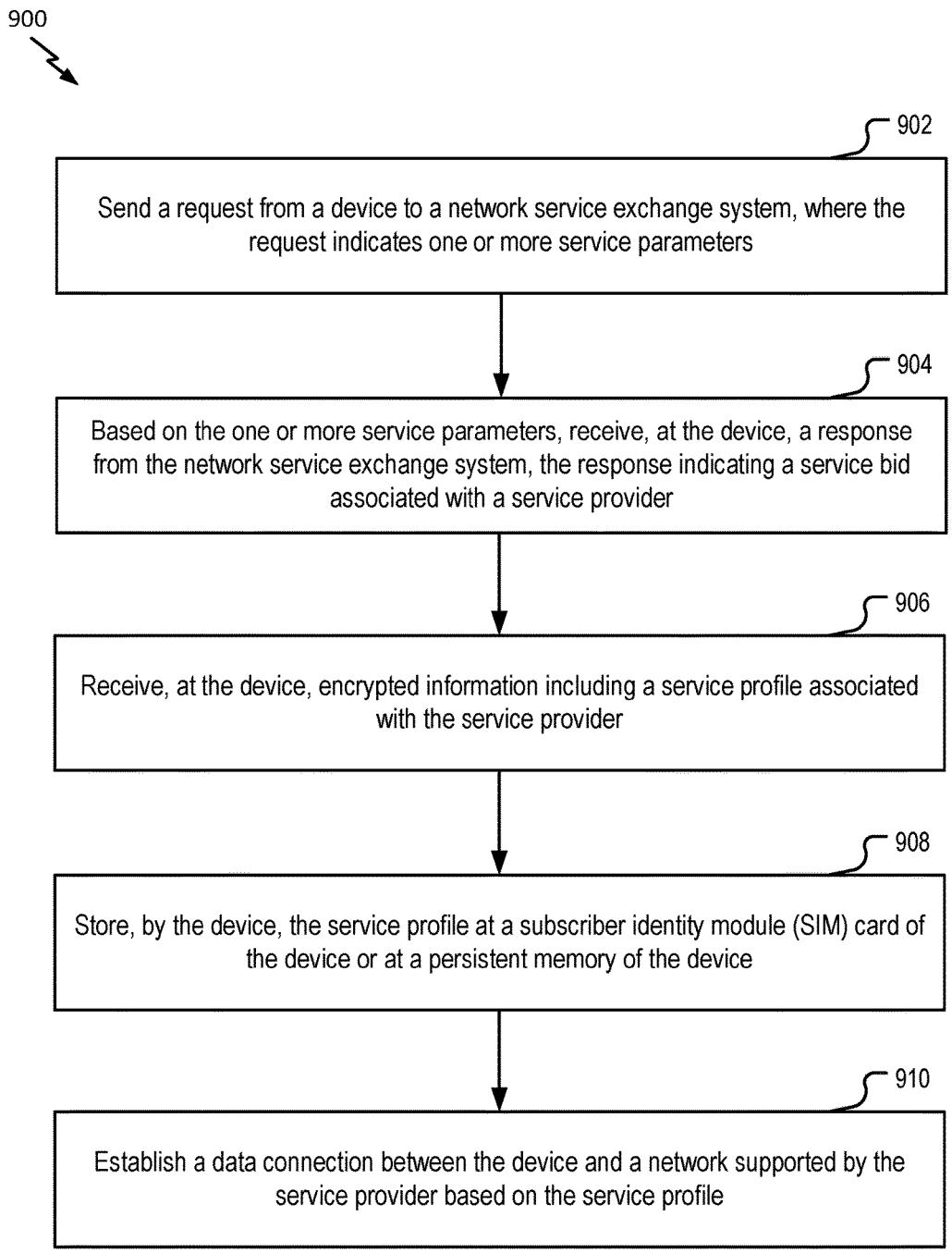
FIG. 9 is a flow chart of an example of a method of operation of a device that communicates with a network service exchange system.

Referring to FIG. 9, a particular illustrative example of a method is depicted and generally designated 900. In a particular example, operations of the method 900 are performed by a device, such as the device 102.

The method 900 includes sending a request from the device to a network service exchange system, at 902. The request indicates one or more service parameters. In a particular example, the device 102 sends to the network service exchange system 104 the request 112 indicating the one or more service parameters 114.

The method 900 further includes receiving, at the device and based on the one or more service parameters, at 904. The response indicates a service bid associated with a service provider. In some examples, the device 102 receives from the network service exchange system 104 the service response 126 indicating the service bid 122.

The method 900 further includes receiving, at the device, encrypted information including a service profile associated with the service provider, at 906. In one example, the device 102 receives the encrypted information 208 including the service profile 212.

The method 900 further includes storing, by the device, the service profile at a subscriber identity module (SIM) card of the device or at a persistent memory of the device, at 908. In some examples, the device 102 stores the service profile 212 at the SIM card 140. In various implementations, the SIM card 140 includes or corresponds to a non-universal SIM card, a universal SIM (USIM) card, an embedded SIM (eSIM) card, a software SIM (softSIM) card, or another SIM card. In some implementations, the SIM card stores, in an encrypted format, a plurality of encrypted service profiles (e.g., the plurality of encrypted service profiles 213) including the service profile. In another example, the device 102 stores the service profile 212 at the persistent memory 142.

The method 900 further includes establishing a data connection between the device and a network supported by the service provider based on the service profile, at 910. In a particular example, the device 102 establishes the data connection 256 between the device 102 and the network 150 supported by the service provider 110 based on the service profile 212. In a particular example, the method 900 includes decrypting the service profile to establish the data connection.

In a particular example, the method 900 further includes performing an over-the-air provisioning process to receive the encrypted information. In one example, the device 102 performs the over-the-air provisioning process 136 to receive the service profile 212 in an encrypted format. In a first example, the request is sent via a second data connection (e.g., the second data connection 236) associated with a second service provider (e.g., the service provider 254) that is distinct from the service provider, and performing the over-the-air provisioning process includes receiving the encrypted information via the second data connection. In a second example, performing the over-the-air provisioning process includes establishing a particular data connection (e.g., the second data connection 236) between the device and the network service exchange system based on a network service exchange profile (e.g., the network service exchange profile 210) associated with the network service exchange system and receiving the encrypted information from the network service exchange system via the particular data connection. In a third example, the request is sent via a second data connection (e.g., the second data connection 236) associated with a second service provider (e.g., the service provider 254) that is distinct from the service provider, and performing the over-the-air provisioning process includes receiving, from the service provider via a communication path distinct from the second data connection (e.g., via the data connection 258), a link (e.g., the link 268) to enable establishment of a secure tunnel via the second data connection to a server to retrieve the encrypted information.

In some implementations, the method 900 further includes receiving, from the network service exchange system, a key (e.g., the key 262) to enable the device to decrypt the service profile from the encrypted information. In some implementations, the method 900 further includes receiving from the network service exchange system a secure transaction log (e.g., the secure transaction log 214) associated with network service exchange operations. In some implementations, the secure transaction log is associated with a per subscriber granularity, a per enterprise granularity, a per auction granularity, or a per service provider granularity. In some implementations, the secure transaction log has a hashed linked list data structure, such as a blockchain data structure.

In some implementations, the method 900 further includes, after receiving the encrypted information, communicating data between the device and a second service provider until a trigger condition is satisfied, and the data connection is established responsive to the trigger condition being satisfied. For example, in some implementations, the trigger condition includes one or more of a change in usage of the data connection 258 by the device 102, a change in available bandwidth of the data connection 258, or a promotional offer associated with the service provider 110. Alternatively or in addition, in some examples, the trigger condition is based on bid rankings (or a change in bid rankings) of the plurality of candidate service providers 106, such as described with reference to FIG. 3.

One or more aspects of FIG. 9 illustrate "consolidation" of service provider information (e.g., bids) by a network service exchange system to perform a reverse auction. As a result, selection of a service provider is simplified for a device, such as the device 102.

Figure 10:
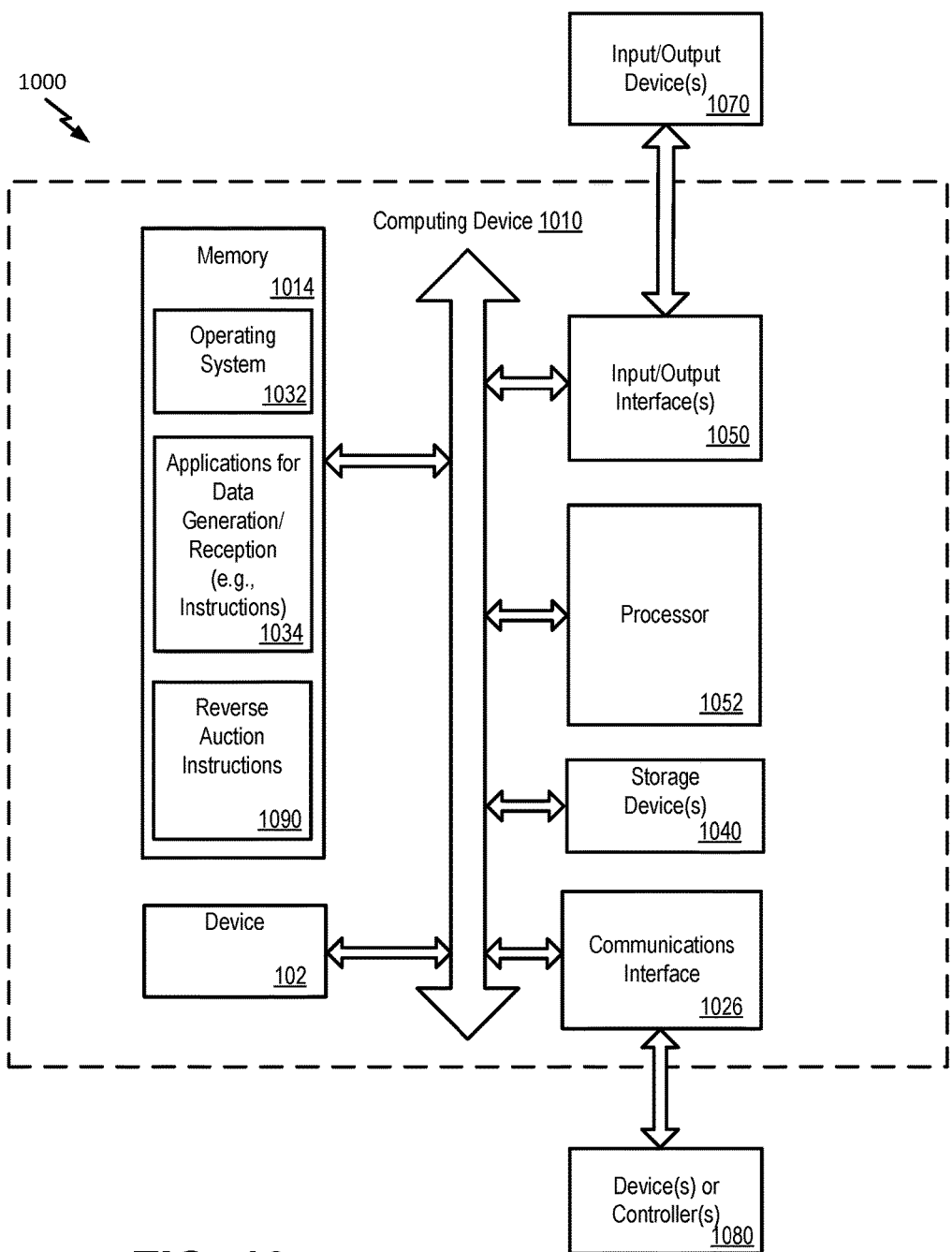
FIG. 10 is a block diagram illustrating aspects of an example of a computing system that includes a device that communicates with a network service exchange system

FIG. 10 is an illustration of a block diagram of a computing environment 1000 including a computing device 1010 (e.g., a general-purpose computing device) configured to support embodiments of computer-implemented methods and computer-executable program instructions (or code) according to the present disclosure. In some examples, the computing device 1010, or portions thereof, execute instructions to perform or initiate operations described herein. In some examples, the computing device 1010 includes or corresponds to the device 102. Alternatively or in addition, in some implementations, one or more aspects described with reference to the computing device 1010 or the computing environment 1000 may be implemented within the network service exchange system 104.

The computing device 1010 includes a processor 1052. The processor 1052 is configured to communicate with a memory 1014 (e.g., a system memory), one or more storage devices 1040, one or more input/output interfaces 1050, a communications interface 1026, or a combination thereof.

Depending on the particular implementation, the memory 1014 includes volatile memory devices (e.g., random access memory (RAM) devices), nonvolatile memory devices (e.g., read-only memory (ROM) devices, programmable read-only memory, or flash memory), one or more other memory devices, or a combination thereof. In FIG. 10, the memory 1014 stores an operating system 1032, which may include a basic input/output system for booting the computing device 1010 as well as a full operating system to enable the computing device 1010 to interact with users, other programs, and other devices. The particular example of FIG. 10 also depicts that the memory 1014 stores one or more applications 1034 executable by the processor 1052. In some examples, the one or more applications 1034 include instructions executable by the processor 1052 to transmit signals between components of the computing device 1010, such as the memory 1014, the one or more storage devices 1040, the one or more input/output interfaces 1050, the communications interface 1026, or a combination thereof.

FIG. 10 also illustrates that the memory 1014 stores reverse auction instructions 1090. In some implementations, the reverse auction instructions 1090 are executable by the processor 1052 to perform certain operations described herein. In one implementation, the computing device 1010 includes or corresponds to the device 102, and the processor 1052 is configured to execute the reverse auction instructions 1090 to perform one or more operations of the method 900 of FIG. 9. In another example, the computing device 1010 includes or corresponds to the network service exchange system 104, and the processor 1052 is configured to execute the reverse auction instructions 1090 to perform one or more operations of the method 600 of FIG. 6, one or more operations of the method 700 of FIG. 7, one or more operations of the method 800 of FIG. 8, or a combination hereof.

In some implementations, one or more storage devices 1040 include nonvolatile storage devices, such as magnetic disks, optical disks, or flash memory devices. In some examples, the one or more storage devices 1040 include removable memory devices, non-removable memory devices or both. In some cases, the one or more storage devices 1040 are configured to store an operating system, images of operating systems, applications, and program data. In a particular example, the memory 1014, the one or more storage devices 1040, or both, include tangible computer-readable media.

In the example of FIG. 10, the processor 1052 is configured to communicate with the one or more input/output interfaces 1050 to enable the computing device 1010 to communicate with one or more input/output devices 1070 to facilitate user interaction. In some implementations, the one or more input/output interfaces 1050 include serial interfaces (e.g., universal serial bus (USB) interfaces or Institute of Electrical and Electronics Engineers (IEEE) 1394 interfaces), parallel interfaces, display adapters, audio adapters, one or more other interfaces, or a combination thereof. In some examples, the one or more input/output devices 1070 include keyboards, pointing devices, displays, speakers, microphones, touch screens, one or more other devices, or a combination thereof. In some examples, the processor 1052 is configured to detect interaction events based on user input received via the one or more input/output interfaces 1050. Additionally, in some implementations, the processor 1052 is configured to send a display to a display device via the one or more input/output interfaces 1050.

In a particular example, the processor 1052 is configured to communicate with (or send signals to) one or more devices 1080 using the communications interface 1026. In some implementations, the communications interface 1026 includes one or more wired interfaces (e.g., Ethernet interfaces), one or more wireless interfaces that comply with an IEEE 802.11 communication protocol, one or more other wireless interfaces, one or more optical interfaces, or one or more other network interfaces, or a combination thereof. In some examples, the one or more devices 1080 include host computers, servers, workstations, one or more other computing devices, or a combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate, but do not limit, the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
   receiving, at a network service exchange system, a request from a device, wherein the request indicates one or more network performance parameters;
   in response to receiving the request, validating the device and the one or more network performance parameters;
   performing a reverse auction to select a service provider from among a plurality of candidate service providers, the service provider selected based on the one or more network performance parameters, wherein performing the reverse auction includes:
   receiving a plurality of bids from the plurality of candidate service providers;
   based on the plurality of bids, determining a plurality of bid scores;
   determining a subset of the plurality of bid scores, the subset associated with networks that satisfy the one or more network performance parameters; and
   selecting the service provider based on a best bid of the subset; and
   after selecting the service provider, performing an over-the-air provisioning process to enable the device to communicate using a network associated with the service provider.

2. The method of claim 1, further comprising, prior to performing the over-the-air provisioning process:
   establishing a first data connection between the device and the network service exchange system using a network service exchange profile that is associated with the network service exchange system; and
   receiving, at the network service exchange system from the service provider, a service profile that is associated with the service provider, and wherein performing the over-the-air provisioning process includes sending the service profile to the device from the network service exchange system via the first data connection.

3. The method of claim 2, wherein the request is received at the network service exchange system from the device via a second data connection that is distinct from the first data connection.

4. The method of claim 1, wherein the over-the-air provisioning process includes sending a key from the network service exchange system to the service provider to enable the service provider to encrypt a service profile that is to be accessed by the device.

5. The method of claim 1, wherein the over-the-air provisioning process includes sending a key from the network service exchange system to the device to enable the device to decrypt a service profile that is to be received by the device from the service provider.

6. The method of claim 1, wherein validating the device includes performing a check of a credit card balance for pre-paid services or a credit check of a party associated with the device for post-paid services.

7. The method of claim 1, further comprising initiating, by the network service exchange system, an inter-carrier number portability procedure to transfer a telephone number associated with the device to the service provider.

8. The method of claim 1, further comprising notifying, by the network service exchange system, a current service provider to perform an inter-carrier number portability procedure to prompt transfer of a telephone number associated with the device to the service provider.

9. An apparatus comprising:
   a memory configured to store instructions; and
   a processor configured to execute the instructions to perform, initiate, or control operations, the operations comprising:
   receiving, at a network service exchange system, a request from a device, wherein the request indicates one or more network performance parameters;
   in response to receiving the request, validating the device and the one or more network performance parameters;
   performing a reverse auction to select a service provider from among a plurality of candidate service providers, the service provider selected based on the one or more network performance parameters, wherein performing the reverse auction includes:
   receiving a plurality of bids from the plurality of candidate service providers;
   based on the plurality of bids, determining a plurality of bid scores;
   determining a subset of the plurality of bid scores, the subset associated with networks that satisfy the one or more network performance parameters; and
   selecting the service provider based on a best bid of the subset; and
   after selecting the service provider, performing an over-the-air provisioning process to enable the device to communicate using a network associated with the service provider.

10. The apparatus of claim 9, wherein the operations further include sending a secure transaction log from the network service exchange system to the device, the secure transaction log associated with network service exchange operations, wherein the secure transaction log is associated with a per subscriber granularity, a per enterprise granularity, a per auction granularity, or a per service provider granularity.

11. The apparatus of claim 9, wherein performing the reverse auction includes identifying, from among the plurality of service providers, one or more particular service providers that are associated with networks satisfying the one or more network performance parameters, the one or more particular service providers including the service provider.

12. The apparatus of claim 9, wherein the one or more network performance parameters include one or more of a bandwidth usage parameter associated with the device, a type of network capability of the device, a number of messages to be transmitted via the network, a frequency of messages to be transmitted via the network, a latency parameter associated with the network, a loss ratio parameter associated with the network, or a jitter parameter associated with the network.

13. A non-transitory computer-readable medium storing instructions executable by a processor to initiate, perform, or control operations, the operations comprising:
  receiving, at a network service exchange system, a request from a device, wherein the request indicates one or more network performance parameters;
  in response to receiving the request, validating the device and the one or more network performance parameters;
  performing a reverse auction to select a service provider from among a plurality of candidate service providers, the service provider selected based on the one or more network performance parameters, wherein performing the reverse auction includes:
    receiving a plurality of bids from the plurality of candidate service providers;
    based on the plurality of bids, determining a plurality of bid scores;
    determining a subset of the plurality of bid scores, the subset associated with networks that satisfy the one or more network performance parameters; and
    selecting the service provider based on a best bid of the subset; and
  after selecting the service provider, performing an over-the-air provisioning process to enable the device to communicate using a network associated with the service provider.

14. The non-transitory computer-readable medium of claim 13, the operations further comprising, prior to performing the over-the-air provisioning process:
  establishing a first data connection between the device and the network service exchange system using a network service exchange profile that is associated with the network service exchange system; and
  receiving, at the network service exchange system from the service provider, a service profile that is associated with the service provider, and wherein performing the over-the-air provisioning process includes sending the service profile to the device from the network service exchange system via the first data connection.

15. The non-transitory computer-readable medium of claim 14, wherein the request is received at the network service exchange system from the device via a second data connection that is distinct from the first data connection.

16. The non-transitory computer-readable medium of claim 13, wherein the over-the-air provisioning process includes sending a key from the network service exchange system to the service provider to enable the service provider to encrypt a service profile that is to be accessed by the device.

17. The non-transitory computer-readable medium of claim 13, wherein the over-the-air provisioning process includes sending a key from the network service exchange system to the device to enable the device to decrypt a service profile that is to be received by the device from the service provider.

18. The non-transitory computer-readable medium of claim 13, wherein validating the device includes performing a check of a credit card balance for pre-paid services or a credit check of a party associated with the device for post-paid services.

19. The non-transitory computer-readable medium of claim 13, the operations further comprising initiating, by the network service exchange system, an inter-carrier number portability procedure to transfer a telephone number associated with the device to the service provider.

20. The non-transitory computer-readable medium of claim 13, the operations further comprising notifying, by the network service exchange system, a current service provider to perform an inter-carrier number portability procedure to prompt transfer of a telephone number associated with the device to the service provider.

* * * * *